United States Patent [19]

Pasinski

[11] 3,724,367

[45] Apr. 3, 1973

[54] PRINT DRUM CLAMP

[75] Inventor: Arthur M. Pasinski, Howell, Mich.

[73] Assignee: Burroughs Corporation, Detroit, Mich.

[22] Filed: Oct. 1, 1970

[21] Appl. No.: 77,288

[52] U.S. Cl..................101/110, 101/248, 29/116 R, 24/279, 287/52.01, 287/118
[51] Int. Cl..........................B41j 1/60, B21b 13/02
[58] Field of Search...........................101/75, 79–83, 101/85–89, 95–97, 110, 248, 375, 74, 59, 76, 77, 378, 14; 197/145, 49, 146, 55; 287/52, 52.96, 52.01, 118; 29/508, 515, 116 R, 116 AD; 24/19, 279, 280, 281, 286, 20 R, 20 LS, 205; 74/813 R, 813 L

[56] References Cited

UNITED STATES PATENTS

| 3,529,545 | 9/1970 | Gartside | 101/247 X |
|---|---|---|---|
| 1,519,544 | 12/1924 | McIndoe | 101/248 X |
| 2,210,500 | 8/1940 | Rohland | 101/378 |
| 737,404 | 8/1903 | Harrison | 24/279 X |
| 2,042,263 | 5/1936 | La Valley | 24/279 |
| 3,565,468 | 2/1971 | Garrett | 24/279 X |
| 2,905,086 | 9/1959 | Zahradnik | 101/248 |
| 626,270 | 6/1899 | Chambon | 101/248 |
| 3,534,682 | 10/1970 | Zenner | 101/109 |
| 2,729,846 | 1/1956 | Reed | 24/20 X |
| 2,989,327 | 6/1961 | Hermanus | 287/52.06 X |
| 3,598,044 | 8/1971 | Hutchinson | 101/76 |

FOREIGN PATENTS OR APPLICATIONS

| 233,427 | 1925 | Great Britain | 24/279 |
| 576,873 | 1946 | Great Britain | 101/110 |

Primary Examiner—Robert E. Pulfrey
Assistant Examiner—Eugene H. Eickholt
Attorney—Kenneth L. Miller and Edwin W. Uren

[57] ABSTRACT

A clamp of one-piece construction for mounting a print drum to a rotatable shaft of a printer is provided, such clamp permitting both angular and lateral repositioning and adjustment of the print drum on the shaft without dismantling or removing any of the parts or mechanisms of the printer.

7 Claims, 4 Drawing Figures

PATENTED APR 3 1973    3,724,367

INVENTOR.
ARTHUR M. PASINSKI
BY Edwin W. Uren
AGENT 3,724,367

PRINT DRUM CLAMP

BACKGROUND OF THE INVENTION

A vast variety of means have been employed in the prior art for fixedly securing elements such as cams, pulleys and drums to their associated shafts for unitary rotation therewith. Such means have provided for the inclusion of corresponding and mating formations or deformations in both the shaft and in the elements to be securely fixed thereto, as for example axially disposed and mating splines or keys and keyways formed in the shaft and in the shaft-fitting aperture of the element to be attached, such mating deformations serving also, when desired, to establish an angular radial relationship between the element and the shaft. Additionally, a variety of clamps and clamping devices have been employed either for the purpose of laterally positioning the attached element such that the deformations of its shaft-fitting aperture are maintained in cooperating relationship with the mating deformations of the shaft, as for the purpose of establishing both the lateral and the angular radial relationship of the element to the shaft. In the latter instance the deformations of the shaft are generally keyed to mating deformations disposed in the clamp or clamping device itself, the clamp being secured to a side surface of the element by any suitable means such as bolts or screws. Known clamps and clamping devices used for this purpose have generally been of a two-piece construction, separate halfs thereof being connectable by screws or bolts to form a hub, the hub being provided either with interiorly disposed deformations matingly corresponding to the deformations of the shaft, for establishing the relative angular relationship therebetween, or provided with a set screw engageably cooperable with a corresponding circumferential groove or flatted portion formed on the shaft, for establishing the relative lateral position of the element on the shaft.

While prior art means for fixedly securing elements such as cams and the like to shafts have proven effective for establishing both the lateral and angular radial relationships therebetween, they have generally proven ineffective when used in connection with elements that require either occassional or frequent lateral and angular repositioning on their support shafts. When this type of repositioning or adjustment is required of an element that is secured by such prior art clamping means, extensive and time-consuming dismantling and reassembly of the clamping device and its related mechanism is generally required, frequently accompanied by the destruction and replacement of parts. In addition to the disadvantages of prior art clamping devices that arise in connection with elements that require occassional or frequent repositioning on their supporting shafts, similar disadvantages have arisen in connection with the initial setting or positioning of certain types of elements such as printing drums, particularly when the accuracy of the lateral and angular placement of the element on the shaft can only be verified in relation to extraneous criteria upon completion of apparatus assembly, as for example in the case of a printing drum, by viewing a line of print printed thereby on a journal sheet or other printable material.

SUMMARY OF THE INVENTION

It is accordingly an object of the present invention to provide an improved clamping device of one-piece construction that may be used effectively for initially securing an element to its supporting shaft, and used conveniently thereafter for alterably adjusting either the lateral or angular relationship of the element to the shaft without dismantling the clamp or the shaft-element assembly.

It is another object of the invention to provide a clamping device which is particularly useful in connection with the assembly of a printing drum on a supporting shaft, such assembly being rendered free of trial and error dismantling and reassembly experience in an effort to achieve the accurate registry of printing on printable material.

It is still another object of the invention to provide an improved clamp for use with printing drums and which effectively overcomes the obstacles inherent in heretofore attempts to accurately align a plurality of printing drums with one another and with a single timing disc.

An important aspect of the invention is the provision of a clamp of one-piece construction for mounting an element and particularly a print drum on a shaft, the clamp being permissive of convenient angular and lateral adjustment of the drum upon the shaft. The clamp is designed to abut one end of the print drum and is fastened to the drum by a screw extending through an arcuate slot formed in a mounting plate of the clamp, the screw being received by a tapped hole in the adjacent end of the drum. Securing means are provided for securing the clamp to the shaft and for laterally positioning the drum thereon. This arrangement provides for the initial approximate positioning of a drum on the shaft, in the desired lateral position, and for convenient subsequent angular adjustment of the drum by means of the arcuate slot of the mounting plate, to thereby effect fine angular adjustment of the drum in coordination with a timing disc or with other print drums which may also be mounted on the same shaft.

BRIEF DESCRIPTION OF THE DRAWINGS

These and other objects, aspects and characteristics of the invention will be more clearly understood from the following description when read in conjunction with the accompanying drawings, in which.

DETAILED DESCRIPTION OF THE INVENTION

Figure 1:
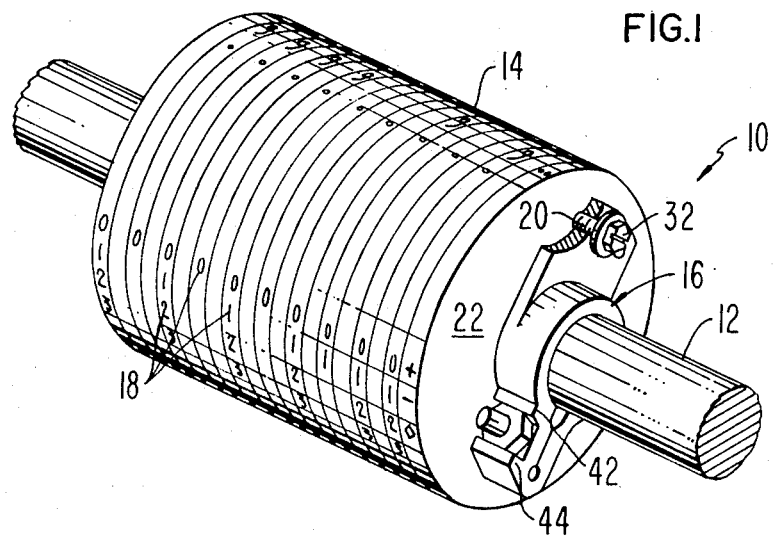
FIG. 1 is a perspective view of a preferred embodiment of the inventive clamp in assembled relationship with a print drum and a mounting shaft.

With reference to the drawings and in particular to FIG. 1, there is shown a print drum assembly 10 comprising, in general, a rotatable shaft 12, a print drum 14 and a clamp 16 of one-piece construction. The print drum 14 is mounted on the shaft 12 by the clamp 16, for joint rotation about a horizontal axis. As is well known in the art, the print drum 14 is comprised of a plurality of print type 18 which are integrally fixed to the periphery of the drum and arranged in rows extending parallel to the axis thereof, and in parallel circumferential columns disposed along its periphery. The rows of type extend the full length of the drum, as shown in FIG. 1. The print type 18 are furthermore arranged so that the columns and rows are disposed in semi-circumferential pattern on the drum surface, the columns comprising print type that is repetitive sequentially and the rows being representative of a print line of a printer (not shown). The print drum 14 includes a tapped hole 20 on its end face 22.

The clamp 16, as previously mentioned, is of one-piece construction and is slidably mounted on the shaft 12 into abutting relationship with the end face 22 of the drum 14. The clamp 16 is preferably made of a suitable epoxy plastic material, such as polycarbonate, which may be molded in the form as illustrated. A collar 24 is provided on the clamp, with a mounting plate 26 extending outwardly from the collar 24 in transverse relationship to the axis thereof. A U-shaped flexible clamping portion generally designated at 28 is disposed opposite the mounting plate 26, such clamping portion being integral with the clamp and transverse to the axis of the collar 24.

Figure 2:
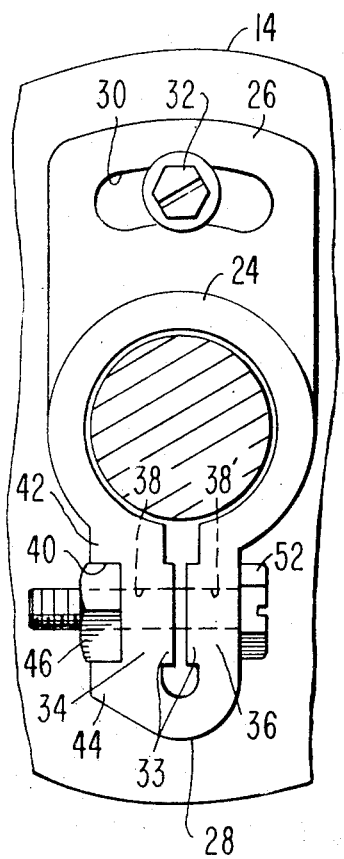
FIG. 2 is a side view of the clamp and end view of the shaft and print drum, the clamp being loosely fitted on the shaft.
Figure 3:
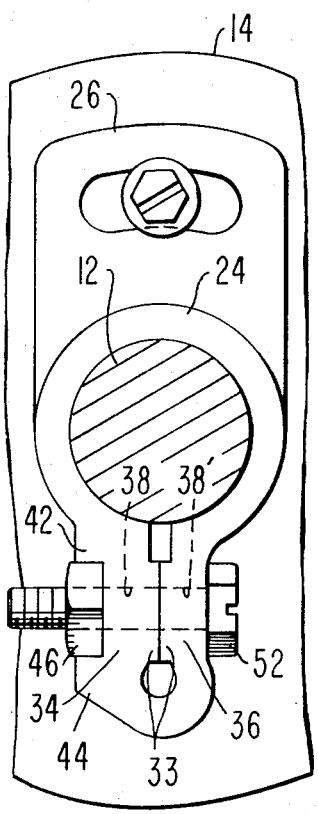
FIG. 3 is a view similar to FIG. 2 but with the clamp secured to the shaft.
Figure 4:
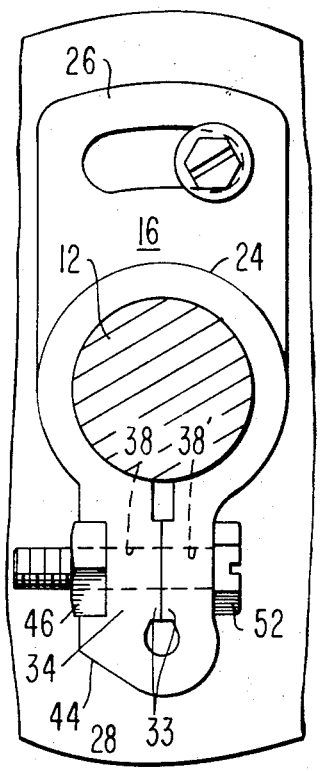
FIG. 4 is another view similar to FIG. 3 and showing the print drum angularly displaced to the right.

As shown in FIGS. 2, 3 and 4, the mounting plate 26 is provided with an arcuate slot 30 having a radius of curvature that is centered at the axis of the shaft 12. This arcuate slot is effective for slidably receiving a screw 32 that extends through the slot and is threadably received by the tapped hole 20 formed in the end face 22 of the print drum 14, the screw, when in its loosened state relative to the tapped hole, permitting angular adjustment of the drum relative to the clamp 16 and to the axis of the shaft 12, and, when in its tightened state, serving to maintain such angular adjustment of the drum relative to the clamp, as shown in FIGS. 3 and 4.

The U-shaped clamping portion 28 is provided with a pair of legs 34 and 36, each leg having an extended inner surface disposed in opposed relationship to the other. These inner surfaces of the legs 34 and 36 bear a parallel confronting relationship to each other, are normally spaced apart, and cooperate, when the clamp 16 is secured to the shaft 12, to serve as limit stops 33—33. A pair of apertures or holes 38, 38' extend through the legs 34 and 36 in a co-axially aligned relationship, the aperture 38 communicating with an enlarged recess in the form of a channel 40 in the outer surface of the leg 34. This channel 40, formed by a pair of ridges 42 and 44 disposed on the leg 34, as best shown in FIG. 1, is structured to retainably receive a nut 46 of a nut and bolt assembly 46–52, the nut 46 being retained or locked by the ridges 42 and 44 against rotation despite the loosened or tightened state of the bolt 52 in the nut.

It will be noted in FIGS. 3 and 4 that the ridges 42 and 44, in combination with the nut 46, serve to reinforce the leg 34 and to provide it with added rigidity. Such reinforcement is not provided for the leg 36 with the result that the latter leg is accordingly displaceable in the direction of the leg 34 to thereby bring the limit stops 33—33 into contacting relationship when the bolt 52 is tightened into the nut 46. Before limiting contact of the limit stops 33—33 occurs, however, the collar 24 is contracted upon the shaft 12 as illustrated by comparison of FIGS. 3 and 4 with FIG. 2 with the result that frictional contact is applied by the collar 24 to the shaft 12, such frictional contact being sufficient to secure the clamp 16 to the shaft 12. It will be appreciated that the distance or gap between the stops 33—33 is dimensioned to be slightly greater than the space between the circumference of the shaft 12 and the collar 24, thereby providing a secure frictional contact therebetween when the bolt 52 is tightened in the nut 46.

It will be apparent from the illustrated and above-described structure of the preferred embodiment of the invention, that the drum 14 may be adjusted a predetermined angular distance relative to the clamp 16 and the shaft 12, after the clamp 16 is securely fixed to the shaft by means of tightening the bolt 52 in the nut 46. This predetermined angular adjustment, equal to the length of the arcuate slot 30 of the mounting plate 26, may be made by rotatably shifting the drum 14 relative to the shaft 12 and the clamp 16, with the screw or threaded member 32 disposed in its loosened state relative to the tapped hole 20. FIG. 4 illustrates the maximum rotatable shift of the drum to the right, dash line 54 representing the shift of the drum position in FIG. 3 to line 54' at the right end of the arcuate slot 30.

OPERATION OF THE DEVICE

When employed in connection with a print drum as shown in the drawings, as for example in a high speed printer, the preferred embodiment of the clamp 16 may be used effectively and conveniently for establishing the initial setting of the drum relative to the shaft 12 during assembly of the high speed printer, and used with equal convenience by the operator of the printer, without any dismantlement of parts, whenever an adjustment in the setting of the drum, relative either to the shaft or to other drums, becomes necessary during subsequent operation of the printer.

During assembly, for example, the drum may be tentatively attached to the shaft 12 by tightening the screw 32 and the bolt 52, before the drum and shaft assembly is installed in the printer. Following installation of the drum and shaft assembly in the printer, the desired setting of the drum on the shaft may be made with convenience, by loosening one or both of the threaded members 32 and 52, shifting the drum laterally and/or angularly on the shaft as required, and retightening the threaded member or members 32 and 52. The bolt 52 would be loosened and retightened when lateral repositioning of the drum is required, and when a rough major angular repositioning is necessary. A fine angular adjustment would then be made by loosening the screw 32, shifting the drum relative to the clamp 16, and retightening the screw 32.

The threaded members 32 and 52 may also be used with convenience for effecting either major or minor adjustments in the setting of a drum whenever the need for lateral or angular adjustment arises during operational use of the high speed printer. Here again, the bolt 52 would be resorted to whenever a lateral or major angular adjustment is desired, and the screw 32 resorted to whenever a fine angular adjustment of the drum is desired. It is to be noted, however, that even fine angular adjustments of the drum may require loosening of the bolt 52 and shifting of the clamp and drum on the shaft, before final refinement of an angular adjustment can be achieved by means of the screw 32, this being the case when the screw 32 is located at the extremity of the arcuate slot 30 corresponding to the direction in which the drum needs to be angularly displaced.

It is apparent that the drum 14 may be repositioned laterally and/or angularly on the shaft 12 without dismantling or removing any of the parts or mechanisms of the high speed printer.

While a preferred embodiment of the invention has been described in considerable detail, various changes and modifications in the structure and physical characteristics of the clamp may be made without departing from the true spirit and scope of the invention.

What is claimed is:

1. An adjustable print drum assembly for use in printers and printing devices, said print drum assembly comprising:

a rotatably mountable shaft, a print drum having printing type disposed in columns and rows on the periphery thereof, said rows being parallel to the axis of the drum, and said print drum also having an axially disposed central bore providing a slidable and rotatable mounting on said shaft, a clamping device of one-piece construction comprising a central, split collar slidably fitting said shaft and laterally abutting one end of said print drum in coaxial relationship therewith and with said shaft, said clamping device further including a mounting plate connected to said collar and extending radially outwardly therefrom and further including means for releasably securing the plate to said abutting end of said print drum, said clamping device additionally including a U-shaped flexible crimping portion composed of a pair of legs individually connected at their inner ends to the split ends of said central collar and extending radially outwardly away therefrom in a direction generally diametrically opposite to that of said mounting plate, the outer ends of the legs of said U-shaped crimping portion being joined together to form the closed end of the U, said legs having coaxially aligned apertures in which a common bolt is received having an associated nut threaded thereon and enabling the bolt to be tightened to compress the legs together and thereby constrict the collar into frictional engagement with the shaft for securely attaching the clamping device to the shaft, said pair of legs of said crimping portion each having inwardly disposed confronting surfaces which are slightly spaced apart when said common bolt is loosened relative to its associated nut but are capable of being brought into abutting relationship when said common bolt is tightened relative to its associated nut to thereby effectuate a limitation on the extent of the compression of said legs, and one of said legs of said clamping device having a locking recess for receiving said nut associated with said common bolt to prevent said nut from rotating, and the other of said legs being dimensionally thinner in the plane thereof transverse to the axis of said shaft and said collar than the leg having said locking recess and being flexibly displaceable upon the tightening of said bolt relative to its said associated nut thereby compressing said pair of legs to securely attach said clamping device and said drum to said shaft by means of said collar.

2. In an adjustable print drum assembly for use in printing devices, a clamp of one piece construction for attachably securing a print drum coaxially to a shaft, said clamp comprising:

a compressible collar wherein said collar's internal circumference exceeds the outer circumference of said shaft when in an uncompressed state and is clampably equal to the circumference of said shaft when in a fully compressed state thereby to effectuate the lateral and angular securement of said clamp on said shaft;

a mounting plate integrally connected to said collar and abuttable with and releasably securable to one end of said print drum thereby affording securement of the clamp to said print drum; and a U-shaped crimping portion comprising a pair of legs so as to provide a suitable provision for compressing the collar into clamping engagement with the shaft, said legs extending outwardly from said collar and integrally connected at their inner ends to the collar and integrally joined together at their outer ends to form a U in the plane transverse to the axis of said shaft, said legs having inwardly disposed confronting surfaces abuttable with one another to act as a limitation on the compression of said collar, one leg being dimensionally thinner in the plane transverse to the axis of said shaft so as to be flexibly displaceable with respect to the other leg thereby facilitating the compression of said collar.

3. The clamp as defined in claim 2 wherein said mounting plate is releasably secured to said end of said print drum by a screw-type device inserted into said end of said print drum and through an arcuate slot in the mounting plate having its axis coincident with that of said shaft, thereby permitting limited adjustment of the angular displacement of said print drum on said shaft.

4. The clamp as defined in claim 2 wherein said one piece clamp is molded out of plastic material having sufficient flexibility to allow said thinner leg to be drawn to the other leg.

5. The clamp as defined in claim 2 wherein the thicker of said legs is further shaped to receive a fastening means for drawing said legs together and additionally providing said thicker leg with added rigidity.

6. The clamp as defined in claim 2 wherein said mounting plate and said U-shaped crimping portion extend radially outwardly from said collar in directions diametrically opposite to one another so as to provide for balanced rotation of the clamp.

7. A clamping device for use in a print drum assembly for fixedly securing a print drum in coaxial relation on a shaft, said clamping device comprising:

a contractible split collar slidably positionable on a shaft and having an internal circumference exceeding the outer circumference of the shaft when said collar is in an uncontracted state and having an internal circumference embraceably equal to the circumference of said shaft when said collar is in a contracted state in order to effectuate the securement of the device to the shaft;

a mounting plate formed of a material homogeneous with that of the collar and integrally joined thereto, said mounting plate extending radially outwardly in one direction from the collar and being abuttable with one end of the print drum on the shaft;

means for releasably securing the mounting plate to the abuttable end of the print drum including an arcuate slot in the plate having the axis of its curvature substantially coincident with that of the collar and further including a threaded fastening instrumentality extending through the arcuate slot for releasably fixedly securing the clamping device to the abuttable end of the print drum but effective when released to permit a limited angular adjustment of the print drum and the clamping device relative to one another;

a pair of generally parallelly extending legs formed of material homogeneous with that of the collar and extending radially outwardly from the collar in the form of a U and in the direction diametrically opposite to that of the mounting plate, said legs having their respective inner ends integrally joined individually to the open ends of the collar and further having their outer ends integrally joined to one another to form the closed end of the U, the legs having inwardly disposed confronting surfaces abuttable with one another to act as a limitation on the contraction of the collar on the shaft; and means engaging the mid-sections of said pair of legs and operable to draw the same relatively toward one another to bring their respective confronting surfaces into abutment, with the result that the collar is contracted to an internal circumference tightly embracing the shaft and being effective to releasably lock the clamping device to the shaft for joint movement therewith.

* * * * *